March 31, 1942.  R. J. OLANDER  2,277,881
SHOCK ABSORBING MECHANISM
Filed Nov. 27, 1940  2 Sheets-Sheet 1
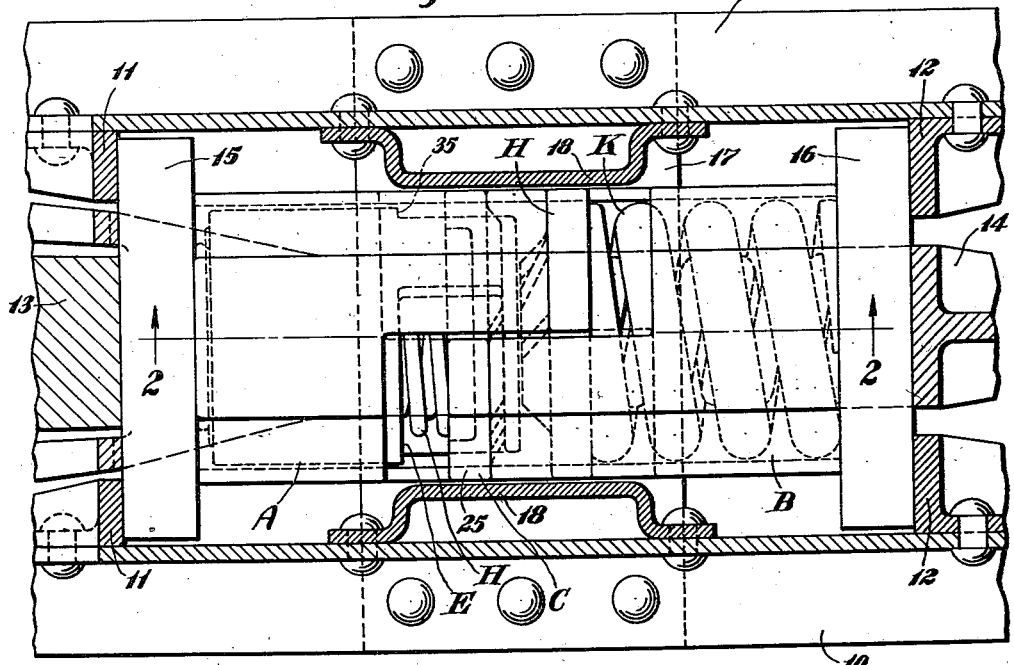
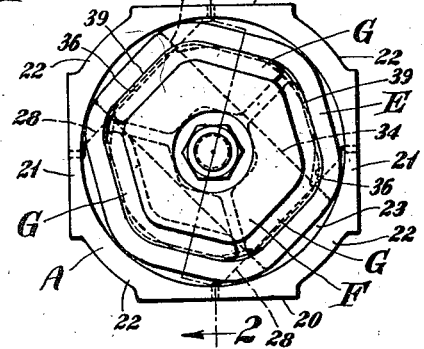
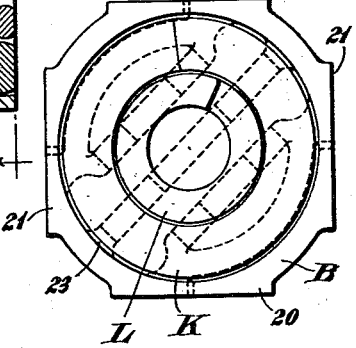
Inventor
Roland J. Olander
By Henry Fuchs.
Atty.

March 31, 1942.　　R. J. OLANDER　　2,277,881
SHOCK ABSORBING MECHANISM
Filed Nov. 27, 1940　　2 Sheets-Sheet 2
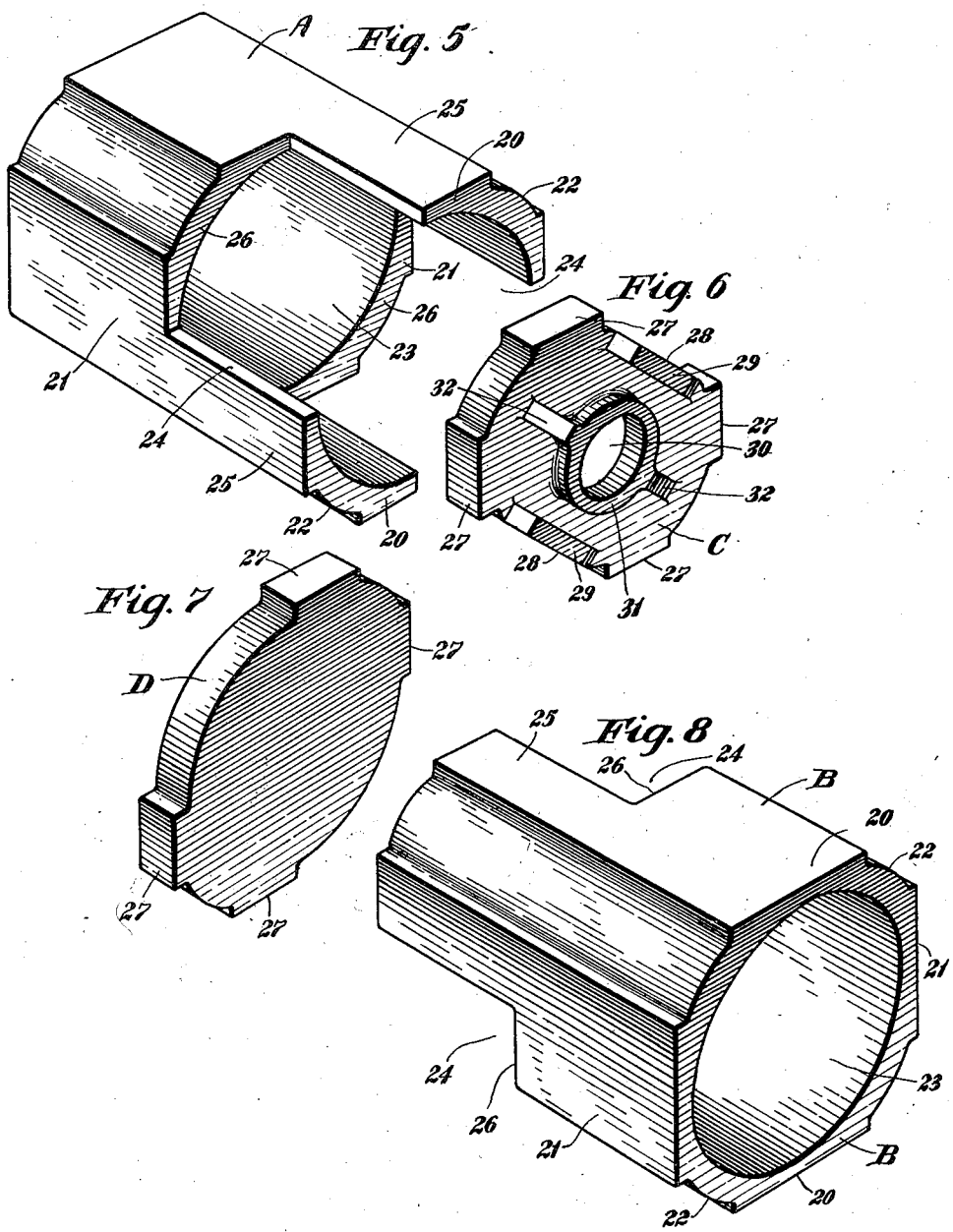
Inventor
Roland J. Olander
By Henry Fuchs
Atty.

Patented Mar. 31, 1942

2,277,881

UNITED STATES PATENT OFFICE 2,277,881

SHOCK ABSORBING MECHANISM

Roland J. Olander, Chicago, Ill., assignor to W. H. Miner, Inc., Chicago, Ill., a corporation of Delaware Application November 27, 1940, Serial No. 367,315

10 Claims. (Cl. 213—24)

This invention relates to improvements in shock absorbing mechanisms.

One object of the invention is to provide an efficient shock absorbing mechanism, especially adapted for railway draft riggings, having combined spring and frictional cushioning action for resisting shocks, wherein the frictional resistance becomes effective to augment the spring resistance to take care of the heavier shocks after initial spring action which absorbs the relatively lighter shocks.

Another object of the invention is to provide a mechanism as set forth in the preceding paragraph wherein the initial spring action is provided by spring means operated in tandem to insure maximum spring capacity, and wherein one of the spring elements employed in the tandem spring action serves as the spring resistance of the friction means and the other spring element of the tandem means is actuated in tandem with the friction means during absorption of the heavier shocks to which the mechanism is subjected.

A more specific object of the invention is to provide a shock absorbing mechanism comprising a friction device or gear and a spring element wherein the friction device includes a friction clutch cooperating with a friction column member and spring resistance opposing relative movement of the clutch and column member, and wherein the spring element and spring resistance of the friction device are actuated in tandem to cushion the initial lighter shocks to which the mechanism is subjected, followed by actuation of the friction device and spring element in tandem to absorb the relatively heavier shocks to which the mechanism is subjected.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith, the front and rear followers of the rigging and the improved shock absorbing mechanism being shown in plan. Figure 2 is a longitudinal vertical sectional view of the shock absorbing mechanism proper, corresponding substantially to the line 2—2 of Figures 1 and 4. Figure 3 is a rear end elevational view of the mechanism shown in Figure 2, looking in the direction of the arrows 3—3. Figure 4 is a front end elevational view of the mechanism shown in Figure 2, looking in the direction of the arrows 4—4. Figure 5 is a perspective view of the front casing of the mechanism. Figure 6 is a perspective view of the front intermediate follower which cooperates with the spring resistance of the friction device or gear of the mechanism. Figure 7 is a perspective view of the rear intermediate follower. Figure 8 is a perspective view of the rear casing of the mechanism.

In said drawings, 10—10 indicate channel-shaped center or draft sills of a railway car underframe to the inner faces of which are secured front and rear stop lugs 11—11 and 12—12. The inner end portion of the drawbar is indicated at 13, to which is operatively secured a hooded yoke 14 of well-known construction. Within the yoke are disposed the usual front and rear followers 15 and 16 and the shock absorbing mechanism proper. The yoke and parts therewithin are supported in operative position by a detachable saddle plate 17 and the shock absorbing mechanism is held properly centered between the sills by guide brackets 18—18 secured to the inner sides of said sills.

My improved shock absorbing mechanism proper, as shown, comprises broadly a front casing or column element A; a rear casing or column element B; a front intermediate follower C; a rear intermediate follower D; a friction shell or casing E; a wedge block F; three friction shoes G—G—G; a spring resistance H within the shell E; a retainer bolt J; a relatively heavy outer coil spring K; and a relatively lighter inner coil spring L.

The two casings A and B are preferably of identical construction. Each of these casings, as shown, comprises horizontally disposed top and bottom walls 20—20 and vertically disposed side walls 21—21. The four corners of each casing are cut away, as shown, providing curved corner walls 22—22 and longitudinally disposed reenforcing ribs at the junctions between the corner walls and the corresponding top, bottom, and side walls. The two casings are reversely arranged end for end, the outer ends of the two casings bearing respectively on the front and rear followers 15 and 16 of the draft rigging. Each casing is open at the outer end, and has a longitudinal cylindrical opening or pocket 23 adapted to accommodate either the friction gear or the springs K and L. At its inner end, that is, the end remote from the main follower on which it bears, each casing is cut away or recessed at diagonally opposite corners, as indicated at 24—24, providing a pair of longitudinally extending arms 25—25 at the inner end of each casing.

As shown, the cut away portions include slightly more than half of the corresponding top, bottom, and side walls of the casing. The two arms 25 have concave inner surfaces which are continuations of the inner surface of the corresponding pocket 23. Each arm also has a convex outer surface which is a continuation of the outer surface of the corresponding corner wall 22 and two flat outer surfaces which are continuations of the outer surfaces of the corresponding walls of the casing, the flat surfaces of each arm being disposed at right angles to each other. At the inner end of each cut away section 24 each casing is provided with a flat transversely extending limiting stop shoulder 26 for a purpose hereinafter described. As will be evident, each casing forms a rigid column element for transmitting forces.

The rear intermediate follower D is in the form of a relatively heavy, substantially flat platelike member of generally circular outline having extensions 27—27 at diametrically opposite sides thereof, corresponding in outline to the end faces of the corresponding arms 25—25. Between the extensions 27—27 the plate is of circular outline, the diameter of the circular portion being slightly less than the diameter of the cylindrical opening of each casing A and B. The intermediate follower D is slidably disposed between the arms 25—25 of the rear casing B, the extensions 27—27 being slidably disposed in the openings 24—24 with the circular edges fitting the concave inner surfaces of the two arms 25—25. The front intermediate follower C is also in the form of a relatively heavy platelike member having projections similar to the projections 27—27 of the plate D which are also indicated by 27—27. The follower C is slidably disposed between the arms 25—25 of the casing A, the extensions 27—27 and 27—27 being slidably disposed in the openings 24—24. The portion of the follower C, which is embraced between the arms 25—25 of the casing A, is cut away at opposite sides to fit into the friction shell E, said cut away sides presenting straight edge faces 28—28 between the corresponding lugs 27—27. At said straight opposite side edges the follower C is provided with rearwardly projecting longitudinal ribs or flanges 29—29 extending along said edges. The follower C also has a central opening 30 for a purpose hereinafter described. The opening 30 is preferably reenforced by a surrounding rearwardly projecting annular flange 31. The flange 31 may be reenforced by ribs 32—32.

The friction casing or shell E is of generally hexagonal contour, being open at its front end and having a transverse rear wall 33. The front intermediate follower C is slidably disposed within the casing E, the longitudinal walls of the casing being cut out at diametrically opposite sides to provide longitudinal openings 34—34 to accommodate the projecting end portions of this follower at the extensions 27—27 and 27—27 thereof. The transverse front end walls of the openings 34—34 form stops or stop shoulders 35—35 for limiting movement of the follower C with respect to the casings. The shell or casing E is of such a size as to telescope loosely within the opening 23 of the casing A so that it is freely moveable lengthwise of said casing. The interior of the shell E is of hexagonal cross section and is inwardly tapered at its open front end, thus presenting six inwardly converging friction faces arranged symmetrically about the longitudinal axis of the shell and providing three surfaces 36—36—36 of V-shaped cross section.

The wedge block F has a flat outer end face 37 adapted to bear on the front follower 15. At the inner end the block F is formed with three flat wedge faces 38—38—38 arranged symmetrically about the longitudinal axis of the mechanism.

The three friction shoes G—G—G are of similar design, each having an outer V-shaped friction surface 39 in sliding frictional engagement with one of the V-shaped friction surfaces 36 of the shell, and a flat wedge face 40 on an enlargement on the inner side thereof in wedging engagement with one of the faces 38 of the wedge block. The inner enlargements of the shoes present transverse flat abutment faces at their inner ends on which a portion of the spring resistance H is adapted to bear.

The spring resistance H comprises four nested coils interposed between the intermediate follower C and the friction clutch of the gear, the front end of the outermost coil bearing on the rear ends of the friction shoes, the front end of the innermost coil bearing on the inner end of the wedge, and the two intermediate coils bearing at their front ends on the inner end faces of enlargements of the shoes. The rear ends of all of these springs, with the exception of the innermost coil, bear on the intermediate spring follower C, the innermost coil bearing on an inwardly projecting hollow boss 41 on the end wall 33 of the shell E. The three outer coils of the spring resistance H yieldingly hold the front intermediate follower C seated on the inner side of the rear wall 33 of the shell, the hollow boss 41 being accommodated in the opening 30 of said follower.

The retainer bolt J holds the friction device assembled and of overall uniform length, having the head thereof, which is at the rear end of the same, anchored in the hollow boss 41 and having the nut thereof, which is at the front end, accommodated in an opening of the wedge block and adapted to shoulder on the rear wall of said opening.

The friction device or friction shock absorber operates in the usual manner, the wedge being forced inwardly in compression to spread the shoes apart and force the same rearwardly against the resistance of the spring resistance H. High frictional resistance is thus created between the shoes and the friction surfaces of the shell on which the shoes slide. When the actuating pressure is reduced, the spring resistance H returns the parts to the normal full release position shown in Figure 2, the innermost spring acting to release the wedge from the shoes.

The springs K and L are disposed within the rear casing B, and bear at their front and rear ends respectively on the rear intermediate follower D and the rear main follower 16.

In assembling the shock absorbing mechanism the friction device, including the shell E, wedge F, shoes G—G—G, front intermediate follower C, and spring H is inserted in the pocket of the casing A, the front intermediate follower C being arranged with the extensions 27—27 working in the corresponding openings 24—24, and the springs K and L are inserted in the pocket of the casing B and the rear intermediate follower D is assembled with the last named casing to slide between the arms 25—25 thereof with the extensions 27—27 working in the corresponding openings 24—24.

The two casings A and B with the parts therein are then assembled with each other so that the two arms 25—25 of the front casing A will be telescoped and slide with respect to the two arms 25—25 of the rear casing B, as best illustrated in Figure 1. It will be evident that when the parts are thus assembled, the rear ends of the arms of the front casing will bear on the rear intermediate follower D and the front ends of the arms of the rear casing B bear on the front intermediate follower C. As will be further seen upon reference to Figure 2, the front intermediate follower is held rearwardly spaced from the stop shoulders 35—35 of the shell E.

The operation of my improved shock absorbing mechanism is as follows: Upon a draft or buffing force being applied to the drawbar 13, the mechanism is compressed between the front and rear followers 15 and 16 of the rigging, the rear follower 16 being pulled forwardly by the yoke 14 as the drawbar is pulled outwardly in draft, thereby compressing the mechanism against the front follower 15, which at this time is held stationary by engagement with the front stop lugs 11—11 against which it bears, and the front follower 15 being forced rearwardly in buff by the drawbar as the latter is forced inwardly, thereby compressing the mechanism against the rear follower 16, which at this time is held stationary by the rear stop lugs 12—12.

During compression of the mechanism the casings A and B which bear respectively on the front and rear followers 15 and 16 are moved toward each other lengthwise of the mechanism. The rear intermediate follower D, which is engaged by the rear ends of the arms 25—25 of the front follower casing A, is thus moved rearwardly toward the rear casing B and the rear follower 16, in buff, and the front intermediate follower C, which bears on the arms of the rear casing B is held stationary. The friction clutch is thus moved rearwardly with the front follower compressing the three outer coils of the spring resistance H against the front intermediate follower C, and the springs K and L are compressed between the rear follower 16 and the rear intermediate follower D which is forced rearwardly with the casing A engaged by the front follower. In this connection it is pointed out that due to the frictional resistance between the clutch of the friction device and the friction shell E the shell will be moved rearwardly in unison with the clutch during this action. During draft action the rear casing B is moved forwardly in unison with the rear main follower, while the rear intermediate follower D is held stationary by contact with the rear ends of the arms 25—25 of the front casing A which bears on the front follower 15, which at this time is held stationary, and the front intermediate follower is moved forwardly with the rear casing B toward the front follower 15.

Thus, during the first part of the compression stroke of the mechanism, the springs K and L are compressed between the rear intermediate follower D and the rear main follower 16, and the three outer coils of the spring H are compressed between the front intermediate follower C and the friction clutch of the friction device. This action continues until the clearance between the front intermediate follower C and the shoulders 35—35 of the friction casing E has been taken up, whereupon the friction device is positively compressed between the casing B and the front main follower 15. During this compression of the friction device, compression of the springs K and L is continued between the rear main follower 16 and the rear intermediate follower D, the friction device and the springs K and L acting in tandem. This tandem action continues until the end of the compression stroke of the mechanism when further relative movement of the casings A and B is arrested by engagement of the front intermediate follower C with the stop shoulders 26—26 of the casing A and engagement of the rear intermediate follower with the stop shoulders 26—26 of the casing B. In this connection it is pointed out that engagement between the front intermediate follower C and the stop shoulders 26—26 of the casing A also determines the limit of compression of the friction device.

When relative movement of the casings has been limited in the manner described, the force is transmitted from the front to the rear main follower through the front and rear casings A and B and the intermediate followers C and D, which together act as a solid column load transmitting member, thereby relieving the springs K and L and the friction device of the shock absorbing mechanism from undue compression.

When the actuating pressure is reduced, the springs K and L and the three outer coils of the spring H return the casings A and B and the intermediate followers C and D to normal position, the parts of the friction device being restored to normal position by all four of the coils of the spring H, as is well known in this art.

My improved mechanism provides the desired light cushioning action to absorb the lighter shocks to which the draft rigging is subjected in service and also effectively takes care of all excessively heavy shocks, the lighter shocks being cushioned by the springs K and L and the three outer coils of the spring H only being compressed during predetermined initial action of the mechanism and the heavy shocks being absorbed by joint action of the spring means K and L and the friction device, in tandem, as the mechanism is compressed to a greater extent.

I have herein shown and described what I now consider the preferred manner of carrying out my invention, but the same is merely illustrative, and I contemplate all changes and modifications that come within the scope of the claims appended hereto.

I claim:

1. In a shock absorbing mechanism for railway draft riggings, the combination with front and rear main followers relatively movable toward each other lengthwise of the mechanism; of front and rear casings bearing respectively on said front and rear main followers; front and rear intermediate followers, said front and rear intermediate followers being longitudinally movable with respect to said front and rear casings; rearwardly projecting pressure transmitting column means on said front casing engaging said rear intermediate follower; forwardly projecting pressure transmitting column means on said rear follower casing engaging said front intermediate follower; a shock absorbing device including a friction clutch, cooperating friction shell, and spring resistance, said clutch and spring resistance being interposed between said front main follower and front intermediate follower with the spring bearing on said last named follower; and spring means interposed between said rear intermediate and rear main followers.

2. In a shock absorbing mechanism for railway draft riggings, the combination with front and rear main followers relatively movable toward and away from each other lengthwise of the mechanism; of front and rear intermediate followers; a friction shock absorbing device including a friction shell, a friction clutch slidable within the shell and spring means, said front intermediate follower being movable to a limited extent with respect to the friction shell, and said clutch and spring means being interposed between said front main and front intermediate followers with the spring bearing on said last named follower; spring means interposed between said rear intermediate and rear main followers; means for transmitting the actuating force from said front main follower to said rear intermediate follower; and means for transmitting the actuating force from said rear main follower to said front intermediate follower.

3. In a shock absorbing mechanism for railway draft riggings, the combination with front and rear main followers relatively movable toward and away from each other lengthwise of the mechanism; of front and rear intermediate followers; a friction shock absorbing device including a friction shell, friction clutch, and a spring resistance, said clutch and spring being interposed between said front main and front intermediate followers, the clutch being engaged by one of, and the spring being engaged by the other of said last named followers, said front intermediate follower having limited movement lengthwise of the mechanism with respect to said shell; spring means interposed between and bearing on said rear intermediate and rear main followers; a column element transmitting the actuating force from said front main follower to said rear intermediate follower; and a second column element interposed between said rear main follower and the front intermediate follower to transmit the actuating force from said rear main follower to said front intermediate follower.

4. In a shock absorbing mechanism for railway draft riggings, the combination with front and rear main followers relatively movable toward and away from each other; of front and rear intermediate followers; cushioning means interposed between said front main and front intermediate followers; a second cushioning means interposed between said rear main and rear intermediate followers, one of said cushioning means being spring means and the other a shock absorbing device, comprising a wedge bearing on the corresponding main follower, friction shoes, a spring interposed between the shoes and front intermediate follower resisting relative approach thereof, and a friction shell cooperating with said shoes, said shell and front intermediate follower being relatively movable to a limited extent in a direction lengthwise of the mechanism; and front and rear column members bearing respectively on said front and rear main followers, said front column member having arms extending rearwardly beyond said front intermediate follower, said rear column member having arms extending forwardly beyond said rear intermediate follower, said arms of said column members being intercalated, the arms of one of said column members engaging the intermediate follower associated with the spring means, and the arms of the other column member engaging the intermediate follower associated with the shock absorbing device.

5. In a shock absorbing mechanism for railway draft riggings, the combination with a main follower; of a second main follower, said main followers being relatively movable toward and away from each other; a friction shock absorbing device bearing at one end on said first named main follower, said friction device including a friction shell, a cooperating friction clutch, and a spring opposing relative longitudinal movement of the clutch and shell; an intermediate follower bearing on the spring of said friction device and being movable to a limited extent with respect to the shell in a direction lengthwise of the mechanism; a column member bearing on said first named main follower, and having arms extending beyond said intermediate follower; a second intermediate follower engaged by said arms; a spring resistance interposed between said second named intermediate follower and the second named main follower; and a second column member bearing on said second named main follower, said second named column member having arms intercalated with said first named arms and extending beyond the second named intermediate follower and engaged with said first named intermediate follower.

6. In a shock absorbing mechanism for railway draft riggings, the combination with a main follower; of a second main follower, said main followers being relatively movable toward and away from each other; a column element bearing on said first named main follower and having spaced arms projecting toward said second named main follower; a second column element bearing on said second named main follower and having spaced arms projecting toward said first named main follower and engaged in the spaces between said first named arms, each of said column members having stop shoulders inwardly of the outer ends of the arms thereof; an intermediate follower interposed between the outer ends of the arms of said first named column element and the stop shoulders of said second named column element, said intermediate follower being engaged by said arms and normally spaced from said shoulders; a second intermediate follower interposed between the outer ends of the arms of said second named column element and the stop shoulders of said first named column element, and normally spaced from said last named shoulders; a friction shock absorbing device including a friction shell, shoes slidable in the shell, a wedge bearing on said first named main follower and in wedging engagement with the shoes, and a spring bearing at one end on said shoes and at the other end on said second named intermediate follower, said shell and second intermediate follower being relatively movable to a limited extent lengthwise of the mechanism; stop means on the shell limiting said lengthwise movement of said second named intermediate follower with respect to said shell; and spring means interposed between and bearing on said first named intermediate follower and second named main follower.

7. In a shock absorbing mechanism for railway draft riggings, the combination with a friction shock absorbing device having preliminary spring action during the first part of the compression stroke including a friction column, a friction clutch movable lengthwise of the column and having frictional engagement therewith, a follower element movable to a limited extent with respect to said column, in a direction lengthwise of said column to provide said preliminary spring action and spring means opposing relative longitudinal movement to said limited extent of said follower element and column and sliding movement of said clutch and column after said preliminary spring action; of a spring shock absorber; and means for compressing said friction device and spring shock absorber in tandem to provide tandem action of the spring means and shock absorber during said first part of the compression stroke and friction action of said friction device in tandem with said spring shock absorber during the remainder of the compression stroke.

8. In a shock absorbing mechanism, the combination with a friction shock absorbing device including a friction column, a friction clutch movable lengthwise of said column and having frictional engagement therewith, and spring means opposing relative sliding movement of said clutch and column; of a spring shock absorber; a follower movable to a limited extent longitudinally with respect to said column; a shoulder on said column engaged by said follower to limit relative movement thereof; means for compressing said spring shock absorber during the entire compression stroke of the mechanism, and means for actuating said follower to compress said spring means in tandem with said spring shock absorber, said follower having shouldered engagement with said shoulder of said column after predetermined compression of the mechanism to said limited extent to effect relative movement of said column and clutch against the resistance of said spring means in tandem with said spring shock absorber.

9. In a shock absorbing mechanism for railway draft riggings, the combination with a main follower; of a second main follower, said main followers being relatively movable toward and away from each other lengthwise of the mechanism; an intermediate follower; a second intermediate follower; spring means interposed between said second intermediate follower and said second main follower; a wedge; friction shoes in wedging engagement with said wedge; a spring resisting movement of said shoes lengthwise of the mechanism; a friction shell in which said shoes are slidable, said shoes, wedge, and spring being interposed between said first named main follower and first named intermediate follower; means for transmitting actuating force from said first named main follower to said second named intermediate follower to compress said spring means between the latter and the other main follower; and means for transmitting the actuating force from said second named main follower to said first named intermediate follower to compress said spring against said shoes, said first named intermediate follower having shouldered engagement with the friction shell after a predetermined compression of the mechanism to effect relative sliding movement of the shell and shoes.

10. In a shock absorbing mechanism for railway draft riggings, the combination with a casing; of a second casing, said casings being movable toward and away from each other lengthwise of the mechanism; an intermediate follower movable in unison with said first named casing; a friction shell freely movable in said first named casing lengthwise thereof; a second intermediate follower movable in unison with said second named casing and relatively to said shell lengthwise thereof; a friction clutch actuated by relative movement of said friction shell and first named casing to slide lengthwise of the shell; spring means compressible between said second named intermediate follower and clutch, said second named intermediate follower having shouldered engagement with the friction shell after a predetermined compression of the mechanism to effect relative movement of the shell and clutch; and a shock absorbing spring within said second named casing actuated by said first named intermediate follower.

ROLAND J. OLANDER.